United States Patent
Khalid et al.

(10) Patent No.: US 9,432,389 B1
(45) Date of Patent: Aug. 30, 2016

(54) SYSTEM, APPARATUS AND METHOD FOR DETECTING A MALICIOUS ATTACK BASED ON STATIC ANALYSIS OF A MULTI-FLOW OBJECT

(71) Applicant: FireEye, Inc., Milpitas, CA (US)

(72) Inventors: Yasir Khalid, Fremont, CA (US); Shivani Deshpande, Fremont, CA (US); Muhammad Amin, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/231,260

(22) Filed: Mar. 31, 2014

(51) Int. Cl.
G06F 21/00 (2013.01)
H04L 29/06 (2006.01)

(52) U.S. Cl.
CPC ................................ H04L 63/1425 (2013.01)

(58) Field of Classification Search
CPC combination set(s) only.
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

IEEE Xplore Digital Library Sear Results for "Detection of unknown computer worms". Http//ieeexplore.ieee.org/searchresult. jsp?SortField=Score&SortOrder=desc&ResultC . . . , (Accessed on Aug. 28, 2009).

(Continued)

*Primary Examiner* — Ghazal Shehni
(74) *Attorney, Agent, or Firm* — Rutan & Tucker, LLP

(57) ABSTRACT

In an embodiment, a threat detection and prevention system comprises a network-traffic static analysis logic and a classification engine. The network-traffic static analysis logic is configured to conduct an analysis of a multi-flow object by analyzing characteristics of the multi-flow object and determining if the characteristics of the multi-flow object is associated with a malicious attack such as being indicative of an exploit for example. The classification engine is configured to receive results of the analysis of the multi-flow object and, based on the results of the analysis of the multi-flow object, determine whether the multi-flow object is associated with a malicious attack.

29 Claims, 9 Drawing Sheets

(56) References Cited

U.S. PATENT DOCUMENTS

| | | |
|---|---|---|
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |

(56) References Cited

U.S. PATENT DOCUMENTS

| | | |
|---|---|---|
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192863 A1* | 8/2007 | Kapoor et al. .......... 726/23 |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |

(56) References Cited

U.S. PATENT DOCUMENTS

| | | |
|---|---|---|
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |

(56) References Cited

U.S. PATENT DOCUMENTS

| | | |
|---|---|---|
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

AltaVista Advanced Search Results. "Event Orchestrator". Http://www.altavista.com/web/results?Itag=ody&pg=aq &aqmode=aqa=Event+Orchesrator . . . , (Accessed on Sep. 3, 2009).
AltaVista Advanced Search Results. "Attack vector identifier". Http://www.altavista.com/web/results?Itag=ody&pg=aq &aqmode=aqa=Event+Orchestrator . . . , (Accessed on Sep. 15, 2009).
Cisco, Configuring the Catalyst Switched Port Analyzer (SPAN) ("*Cisco*"), (1992-2003).
Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").
Excerpt regarding First Printing Date for Merike Kaeo, *Designing Network Security* ("Kaeo"), (2005).
*The Sniffers's Guide to Raw Traffic* available at: yuba.stanford.edu/~casado/pcap/section1.html, (Jan. 6, 2014).
NetBIOS Working Group. *Protocol Standard for a NetBIOS Service on a TCP/UDP transport: Concepts and Methods.* STD 19, RFC 1001, Mar. 1987.
"Network Security: NetDetector—Network Intrusion Forensic System (NIFS) Whitepaper", ("*NetDetector Whitepaper*"), (2003).
"Packet", *Microsoft Computer Dictionary*, Microsoft Press, (Mar. 2002), 1 page.
"When Virtual is Better Than Real", *IEEEXplore Digital Library*, available at, http://ieeexplore.ieee.org/xpl/articleDetails.jsp?reload=true&arnumber=990073, (Dec. 7, 2013).
Abdullah, et al., Visualizing Network Data for Intrusion Detection, *2005 IEEE Workshop on Information Assurance and Security*, pp. 100-108.
Adetoye, Adedayo , et al., "Network Intrusion Detection & Response System", ("Adetove"), (Sep. 2003).

Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", *J Comput Virol*, Springer-Verlag, France., (2006), pp. 67-77.
Boubalos, Chris , "Extracting syslog data out of raw pcap dumps, seclists.org, Honeypots mailing list archives", available at http://seclists.org/honeyposts/2003/q2/319 ("Boubalos"), (Jun. 5, 2003).
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.
Cohen, M.I. , "PyFlag—An advanced network forensic framework", *Digital investigation 5*, Elsevier, (2008), pp. S112-S120.
Costa, M. , et al., "Vigilante: End-to-End Containment of Internet Worms", *SOSP '05*, Association of Computing Machinery, Inc., Brighton U.K., (Oct. 23-26, 2005).
Crandall, J.R. , et al., "Minos:Control Data Attack Prevention Orthogonal to Memory Model", *37th International Symposium on Microarchitecture*, Portland, Oregon, (Dec. 2004).
Deutsch, P. , ""Zlib compressed data format specification version 3.3" RFC 1950, (1996)".
Distler, "Malware Analysis: An Introduction", *SANS Institute InfoSec Reading Room*, SANS Institute, (2007).
Dunlap, George W. , et al., "ReVirt: Enabling Intrusion Analysis through Virtual-Machine Logging and Replay", *Proceeding of the 5th Symposium on Operating System Design and Implementation, USENIX Association*, ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., Reconstructing System State for Intrusion Analysis, Apr. 2008 *SIGOPS Operating Systems Review*, vol. 42 Issue 3, pp. 21-28.
Hjelmvik, Erik , "Passive Network Security Analysis with NetworkMiner", (*In*)*Secure*, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", *Proceedings of the 13th Usenix Security Symposium (Security 2004)*, San Diego, (Aug. 2004), pp. 271-286.
Krasnyansky, Max , et al., *Universal TUN/TAP driver*, available at https://www.kernel.org/doc/Documentation/networking/tuntap.txt (2002) ("Krasnyansky").
Kreibich, C. , et al., "Honeycomb-Creating Intrusion Detection Signatures Using Honeypots", *2nd Workshop on Hot Topics in Networks (HotNets-11)*, Boston, USA, (2003).
Kristoff, J. , "Botnets, Detection and Mitigation: DNS-Based Techniques", *NU Security Day*, (2005), 23 pages.
Liljenstam, Michael , et al., "Simulating Realistic Network Traffic for Worm Warning System Design and Testing", *Institute for Security Technology studies, Dartmouth College*, ("Liljenstam"), (Oct. 27, 2003).
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Morales, Jose A., et al., "Analyzing and exploiting network behaviors of malware.", *Security and Privacy in Communication Networks*. Springer Berlin Heidelberg, 2010. 20-34.
Natvig, Kurt , "SandboxII: Internet", *Virus Bulletin Conference*, ("Natvig"), (Sep. 2002).
Newsome, J. , et al., "Dynamic Taint Analysis for Automatic Detection, Analysis, and Signature Generation of Exploits on Commodity Software", In *Proceedings of the 12th Annual Network and Distributed System Security, Symposium (NDDS '05)*, (Feb. 2005).

(56) References Cited

OTHER PUBLICATIONS

Newsome, J. , et al., "Polygraph: Automatically Generating Signatures for Polymorphic Worms", In *Proceedings of the IEEE Symposium on Security and Privacy*, (May 2005).
Nojiri, D. , et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Work Containment in the Internal Network", (Mar. 2003), pp. 1-25.
Singh, S. , et al., "Automated Worm Fingerprinting", *Proceedings of the ACM/USENIX Symposium on Operating System Design and Implementation*, San Francisco, California, (Dec. 2004).
Spitzner, Lance , "Honeypots: Tracking Hackers", ("Spizner"), (Sep. 17, 2002).
Thomas, H. Ptacek, and Timothy N. Newsham , "Insertion, Evasion, and Denial of Service: Eluding Network Intrusion Detection", *Secure Networks*, ("Ptacek"), (Jan. 1998).
Venezia, Paul , "NetDetector Captures Intrusions", *InfoWorld* Issue 27, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with USB hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].
Heng Yin et al, Panorama: Capturing System-Wide Information Flow for Malware Detection and Analysis, Research Showcase @ CMU, Carnegie Mellon University, 2007.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Mori, Detecting Unknown Computer Viruses, 2004, Springer-Verlag Berlin Heidelberg.
Oberheide et al., CloudAV.sub.--N-Version Antivirus in the Network Cloud, 17th USENIX Security Symposium USENIX Security '08 Jul. 28-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM, APPARATUS AND METHOD FOR DETECTING A MALICIOUS ATTACK BASED ON STATIC ANALYSIS OF A MULTI-FLOW OBJECT

FIELD

Embodiments of the disclosure relate to the field of network and cyber security. More specifically, one embodiment of the disclosure relates to a system, apparatus and method for detecting a malicious attack based, at least in part, on results associated with an analysis of the characteristics of a multi-flow object, where such analysis may be triggered through feedback signaling after virtual processing of the multi-flow object.

GENERAL BACKGROUND

Over the last decade, malicious software has become a pervasive problem for Internet users as most networked resources include software vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network resources continue to be the targeted by exploits.

In general, an exploit is information that attempts to take advantage of a vulnerability by adversely influencing or attacking normal operations of a targeted computer. As an illustrative example, a Portable Execution Format (PDF) file may be infected with an exploit that is activated upon execution (opening) of the PDF file and takes advantage of a vulnerability associated with particular version or versions of Acrobat® Reader or another PDF reader application. This type of malicious attack may be designed to subsequently control operations of the targeted computer, which may include secretive transmission of stored sensitive information.

Currently, known security appliances are deployed with the capability of conducting a static analysis of a single flow for anomalous behavior that may represent a malicious attack. However, such analysis has been prone to false negatives because conventional security appliances fail to analyze the characteristics associated with multiple related flows.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
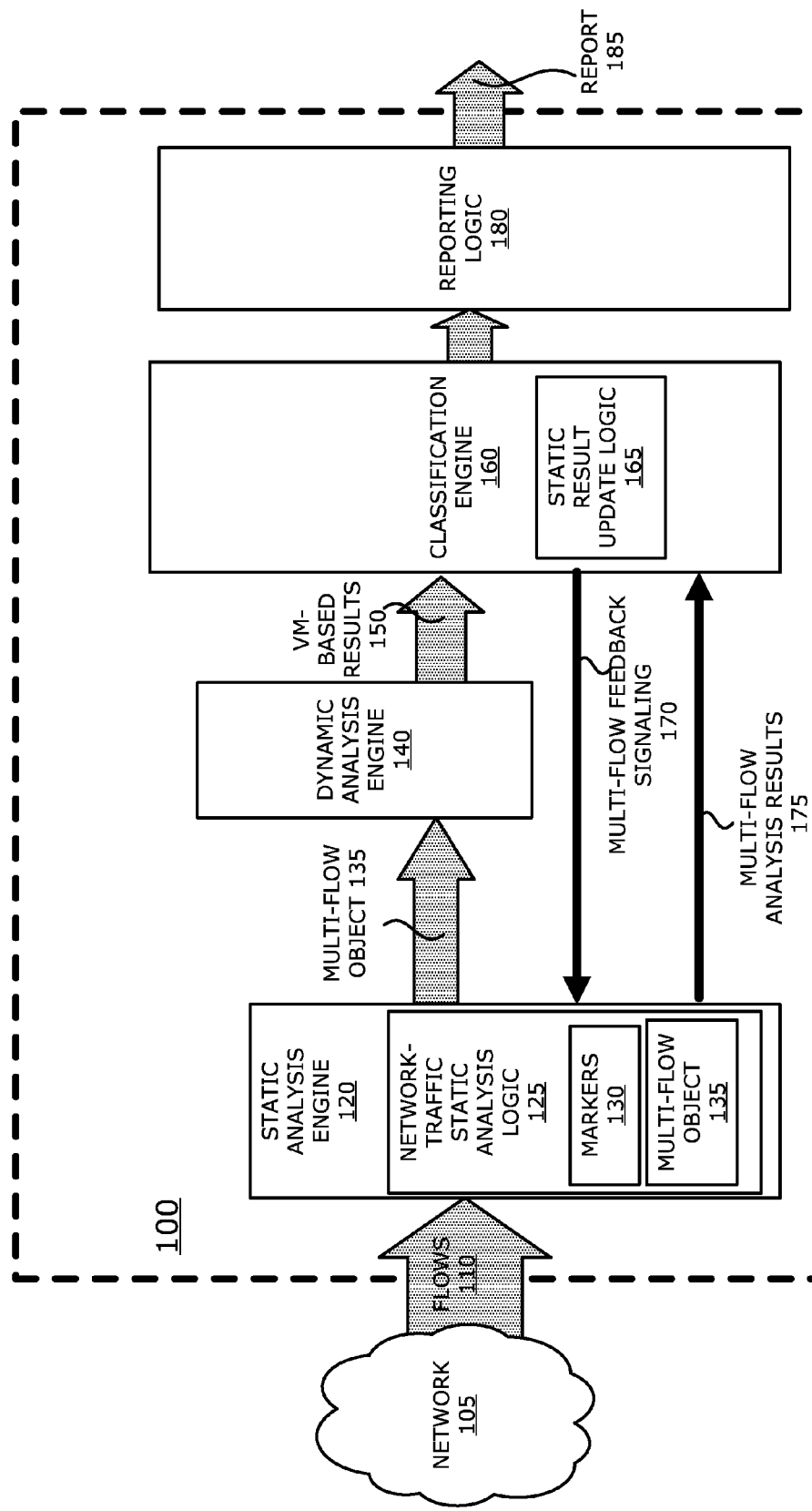
FIG. 1 is an exemplary block diagram of an operational flow of threat detection and prevention within an electronic device.

Various embodiments of the disclosure relate to an electronic device with network connectivity, such as a threat detection and prevention (TDP) system for example, where the electronic device comprises a static analysis engine, a dynamic analysis engine and a classification engine.

According to various embodiments, a TDP system comprises a feedback path (e.g., over a communication medium) to a static analysis engine over which a feedback signal ("request message") may be sent from either a dynamic analysis engine or classification engine so as to trigger one or more actions by the static analysis engine. These actions may include: (1) modifying a multi-flow object (MFO) by re-aggregating messages and flows stored in the TDP system that correspond to multiple related flows (described below) so as to generate a modified MFO; (2) performing a static analysis or enhanced static analysis on the MFO (or modified MFO); and/or (3) providing the results of the static analysis of the MFO (or modified MFO) to the dynamic analysis engine or the classification engine. The enhanced static analysis may constitute more in-depth static analysis or may encompass different type(s) of static analysis, as may be identified based on the dynamic analysis results. In one embodiment, the dynamic analysis engine may perform a dynamic analysis on the MFO prior to the request message being sent, and/or may perform a dynamic analysis on the MFO after its static analysis or on the modified MFO after its static analysis.

Based on the above discussion, it is contemplated that multiple embodiments of the invention are described and some or all of the above-described features may be present in any of these embodiments. Also, throughout the application, the terms "multi-flow object" and "MFO" should be construed as corresponding to a multi-flow object or a modified multi-flow object that includes one or more additional messages for a related flow or one or more additional related flows after a static analysis has been conducted on the multi-flow object.

I. Detailed Summary

According to one embodiment of the disclosure, the static analysis engine comprises network-traffic static analysis logic that is configured to parse incoming network traffic by aggregating (or re-aggregating) information associated with multiple related flows, identifying the multiple related flows as a multi-flow object "MFO" (or a modified MFO), and subsequently storing markers associated with the MFO (e.g., MFO or modified MFO as described above). In general, a "marker" is information associated with characteristics of these flows. Examples of the markers may include, but are not limited or restricted to characteristics related to communication protocols applicable to the multiple related flows. For example, markers may include the following: (i) header types within HTTP-based message(s); (ii) parameter values for corresponding headers within HTTP-based messages); and/or (iii) ordering and/or protocol information associated with HTTP-based messages formulating the flows.

Furthermore, the network-traffic static analysis logic is configured to analyze information associated with the characteristics of the MFO, including the markers without executing the MFO, to determine if the information identifies abnormalities that are suspicious or even malicious in nature. For instance, the network-traffic static analysis logic may analyze the content of messages within the MFO for abnormalities (e.g., message formatting informalities such as headers that are not in typical order, presence of additional headers or absence of expected headers, unexpected or varying parameter values in the header fields; presence of executables; etc.) as well as analyze the anomalous ordering of messages associated with the multi-flow object (hereinafter, "message ordering").

In particular, according to an (first) embodiment of the disclosure, a static analysis of characteristics of the MFO may be conducted in real-time by the network-traffic static analysis logic to produce results. These static analysis results may be automatically provided to the classification engine, which uses the results to determine if the MFO is part of a malicious attack (e.g., indicative of an exploit). The static analysis results may include a "score", namely a value representing a level of confidence (or probability) that certain characteristics for one or more objects within the MFO are anomalous and may be associated with a malicious attack (e.g., indicative of an exploit). For instance, according to this embodiment of the disclosure, the static analysis may be directed to stored markers, message ordering and/or (ii) message formatting.

According to another (second) embodiment of the disclosure, a first static analysis of the characteristics of the MFO may be conducted in real-time. The first static analysis comprises heuristic analysis (e.g., examination of content within the MFO based on experimental knowledge or statistics to determine statistical probabilities as to whether the content is associated with a malicious attack); determinative analysis (e.g., examination of content within the MFO where anomalies may be determined with reference to a rule or policy); and/or signature matching (e.g., examination of content within the MFO with reference to a database of exploit, malware or vulnerability signatures). The results of the first static analysis may include a first score indicating whether or not the MFO has characteristics associated with a malicious attack.

Independent of whether or not the score is provided to the classification engine, a second (enhanced) static analysis is conducted on the MFO, namely the MFO on which the first static analysis was conducted or a modified MFO in the event that one or more additional messages/flows associated with the MFO were received after the first static analysis. According to one embodiment of the disclosure, the second static analysis is conducted in response to a triggering event, such as feedback signaling for example. The second static analysis (also referred to as "multi-flow analysis") may be conducted to analyze characteristics (e.g., message ordering, message formatting, etc.) of the MFO that may not have been analyzed (fully or in any manner) during the first static analysis. The second static analysis results generated by the network-traffic static analysis logic may include (i) a second score based on newly uncovered anomalous characteristics, (ii) anomalous characteristics detected during the second static analysis, which may include markers associated with the MFO, and/or (iii) an updated score or markers for the modified MFO, which now may include, for example, additional related flow or additional messages within one of its flows beyond those flows and messages detected at time "t1". Time "t1" may correspond to the time at which the first static analysis was conducted on the MFO, and, in some embodiments, may correspond to the time at which a first score associated with the MFO was reported to the classification engine. The modified MFO may include one or more flows and additional messages received and stored in the TDP system between t1 and t2, where "t2" may correspond to the time at which the second static analysis was initiated/conducted on the modified MFO.

It is contemplated that, besides conducting static analysis of its characteristics, the network-traffic static analysis logic may route the MFO (e.g., MFO or modified MFO) to the dynamic analysis engine for virtual processing in order to verify that the MFO is part of a malicious attack. According to the first embodiment of the disclosure, the network-traffic static analysis logic may operate as a filter by providing a "suspicious" MFO to the dynamic analysis engine for further in-depth analysis. The MFO is suspicious ("suspect") upon determining that it likely has characteristics associated with a malicious attack. Alternatively, according to the second embodiment of the disclosure, the network-traffic static analysis logic may operate to provide the MFO to the dynamic analysis engine upon receiving the feedback signaling and (i) determining that there have been additional messages or flows since a prior static analysis for that MFO was conducted, and/or (ii) determining that the second static analysis produces the score (or updated) score above a certain threshold to denote that the network-traffic static analysis logic still considers the MFO to be suspicious.

Of course, it is contemplated that, after parsing the network traffic, the network-traffic static analysis logic may simply forward the MFO (or portions thereof) to the dynamic analysis engine without analysis of its characteristics, unless and until the dynamic analysis engine or the classification engine provides feedback signaling and the static analysis is invoked or triggered.

The dynamic analysis engine comprises virtual execution logic to automatically and subsequently analyze, without user assistance, content associated with a MFO provided from the network-traffic static analysis logic in order to verify whether the MFO is part of a malicious attack (e.g., indicative of an exploit). In general, the dynamic analysis engine conducts virtual machine (VM) based analysis to recreate the attack scenario for the multiple related flows associated with the MFO and monitors the resultant behaviors for anomalous activity. The dynamic analysis engine provides results associated with this VM-based analysis (VM-based results) to the classification engine.

According to one embodiment of the disclosure, in response to a triggering event, the classification engine issues multi-flow feedback signaling to the network-traffic static analysis logic. The triggering event may be caused by a failure to detect the MFO as being part of a malicious attack due to any number of factors (e.g., defect in the software and/or incomplete content analyzed). The multi-flow feedback signaling may be configured as a request message that identifies the multi-flow object under analysis, where such identification may be represented by the source (client) IP address, an identifier assigned to the multi-flow object (e.g., a sequence number, monotonic count value, etc.), or the like.

Upon receipt of the multi-flow feedback signaling, the classification engine receives results of a subsequent static analysis from the network-traffic static analysis logic. For instance, as described above, the network-traffic static analysis logic may be configured, in response to the multi-flow feedback signaling, to conduct the second (in-depth) static analysis and the second static analysis results are returned to the classification engine. Hence, the decision as to whether the MFO is malicious or not may be conducted at the end of this feedback loop based in part on the second static analysis.

Accordingly, a determination is made by the classification engine as to whether a MFO is part of a malicious attack based on results provided by (i) the network-traffic static analysis logic alone or (ii) the network-traffic static analysis logic and the dynamic analysis engine.

II. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, such as a group of related packets associated with a request-response message pairing for example, normally having a logical structure or organization that enables classification for purposes of analysis. For instance, an object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

The term "flow" generally refers to a collection of related objects (e.g., messages), communicated during a single communication session between a single source network device (e.g., client device) and a single destination network device (e.g., server).

Similarly, the term "multi-flow object" generally refers to a collection of related flows having one or more objects communicated proximate in time, where the one or more objects are either directed to a single client device from one or more servers or directed to one or more servers from the single client device. As an illustrative example, a multi-flow object may include one or more objects associated with a set of related flows such as a sequence of transmissions in accordance with a particular communication protocol (e.g., Hypertext Transfer Protocol "HTTP"). For instance, a first flow (GET HTTP Request message) may be user initiated while subsequent flows (e.g., other HTTP messages initiated to complete the GET HTTP Request message) may be initiated automatically without user intervention.

A "communication session" may be defined as a semi-permanent information exchange between source and destination electronic devices. For example, the communication session may be in accordance with protocols at the application layer (HTTP), session layer, or transport layer (TCP) of the OSI model.

A "message" generally refers to information transmitted as information in a prescribed format, where each message may be in the form of one or more packets, frames, HTTP-based transmissions, or any other series of bits having the prescribed format.

The term "transmission medium" is a physical or logical communication path between two or more electronic devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

In certain instances, the term "verified" are used herein to represent that there is a prescribed level of confidence (or probability) on the presence of an exploit within an object under analysis. Also, an "exploit" may be construed broadly as information (e.g., executable code, data, command(s), etc.) that attempts to take advantage of a software vulnerability, namely a coding error or artifact of software (e.g., computer program) that allows an attacker to alter legitimate control flow during processing of the software (computer program) by an electronic device, and thus, causes the electronic device to experience undesirable or unexpected behaviors.

The term "computerized" generally represents that any corresponding operations are conducted by hardware in combination with software and/or firmware. Also, the terms "compare" or "comparison" generally mean determining if a match (e.g., a certain level of matching) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detection, verification and/or prioritization of malicious content such as exploits. As this invention is susceptible to embodiments of many different forms, it is intended that the present disclosure is to be considered as an example of the principles of the invention and not intended to limit the invention to the specific embodiments shown and described.

III. Operational Flow

Referring to FIG. 1, an exemplary block diagram of an operational flow of threat detection and prevention within an electronic device 100 is shown. Herein, some or all of the incoming objects 110 associated with the monitored network traffic, namely multiple flows, are received over a network 105 by a network-traffic static analysis logic 125. The network-traffic static analysis logic 125 is part of the static analysis engine 120, which may further conduct signature and/or vulnerability checks aside from the operations described herein.

According to one embodiment, the network-traffic static analysis logic 125 is configured to aggregate multiple related flows as a multi-flow object and analyze characteristics of the multi-flow object for use in classifying the multi-flow object as either benign or malicious. According to one embodiment of the disclosure, multi-flow analysis results 175 may be provided to classification engine 160 for classification of the multi-flow object independent of VM-based results 150 and/or without being triggered by multi-flow feedback signaling 170, as described below.

More specifically, the network-traffic static analysis logic 125 aggregates multiple related flows to produce a multi-flow object 135. The aggregation may be performed by collecting information associated with messages from/to the same network address, such as communications sourced from the same client Internet Protocol (IP) address for example. During or after aggregating the multiple related flows forming the multi-flow object 135, the network-traffic static analysis logic 125 further correlates and stores information (hereinafter "markers 130") associated with characteristics of these flows. These characteristics may be directed to content within messages forming the multiple related flows, protocol, format, message ordering, or the like.

Although not shown in FIG. 1, as an illustrative example, a HTTP GET Request message (flow 1) and subsequent HTTP messages (flows 2, 3, etc.) to complete the HTTP GET Request message may be construed as the multi-flow object 135. The markers 130 associated with this multi-flow object may include parameter values for corresponding headers such as (i) domain name of the server to which the GET HTTP request is directed (Host); (ii) content-types that are acceptable for the response (Accept); (iii) list of acceptable languages for response (e.g., Accept-Language); (iv) type of connection preferred by the user initiating the request (Connection); or the like. The markers 130 may further include format information directed to placement of the headers within the messages as well as detected ordering of the messages themselves.

During and/or subsequent to generation of the multi-flow object 135, the network-traffic static analysis logic 125 may conduct an (static) analysis of the characteristics of the multi-flow object 135, where the markers 130 are analyzed for abnormalities. For instance, the network-traffic static analysis logic 125 may analyze the markers 130 for anomalous characteristics such as abnormalities within the content itself (e.g., headers that are not in typical order, additional headers, presence of executables, etc.) and/or anomalous activity (e.g., abnormal ordering of messages associated with the multi-flow object). The results of such analysis (e.g., the multi-flow analysis results 175) may be provided to classification engine 160 for classifying the multi-flow object 135 as malicious or benign with or without (i) consideration of the VM-based results 150 or (ii) prompting by multi-flow feedback signaling 170 from classification engine 160.

Figure 2A:
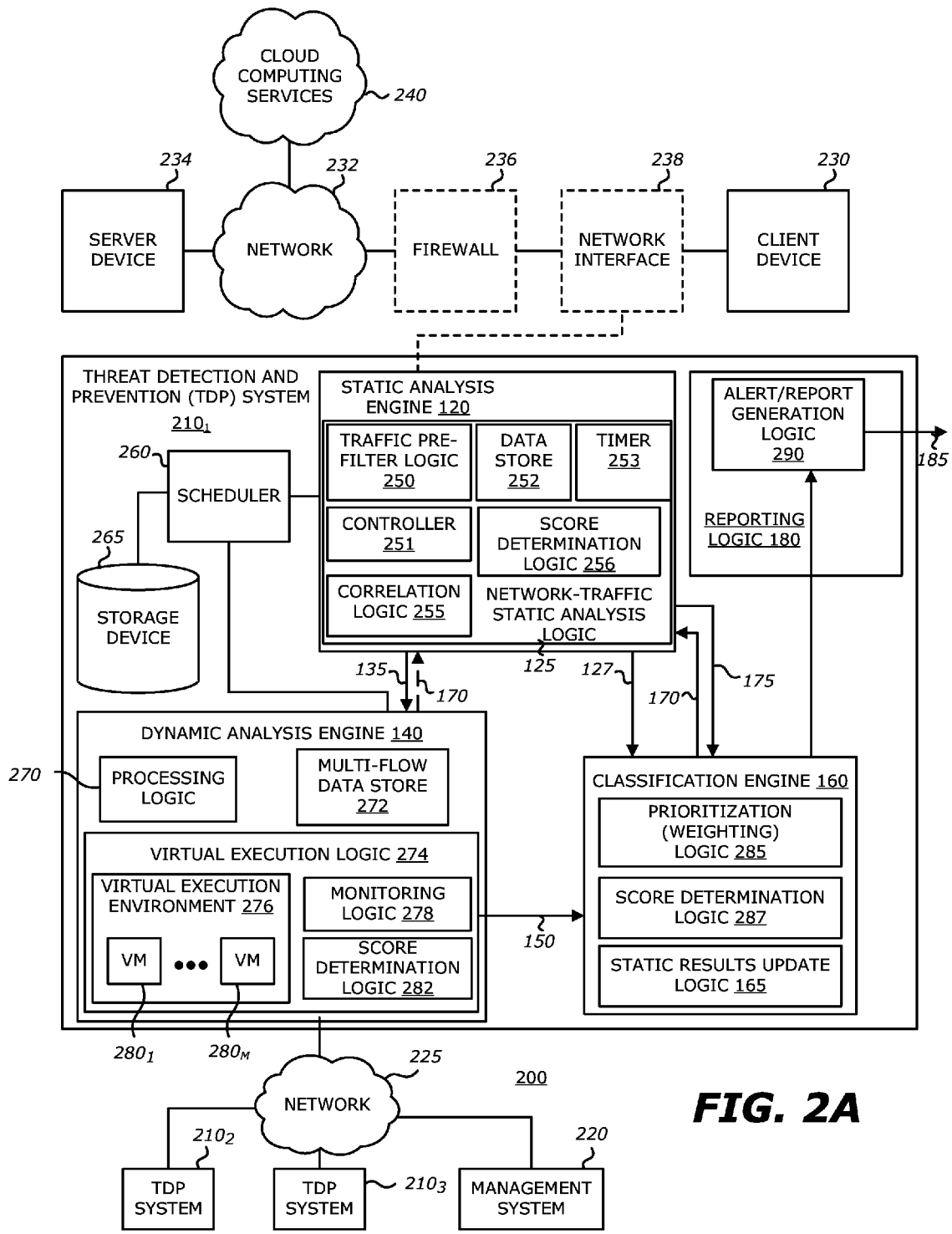
FIG. 2A is a first exemplary block diagram of a communication system deploying a plurality of threat detection and prevention (TDP) systems with a framework for detecting a malicious attack based on, at least in part, static analysis of the construct of the suspect object.
Figure 2B:
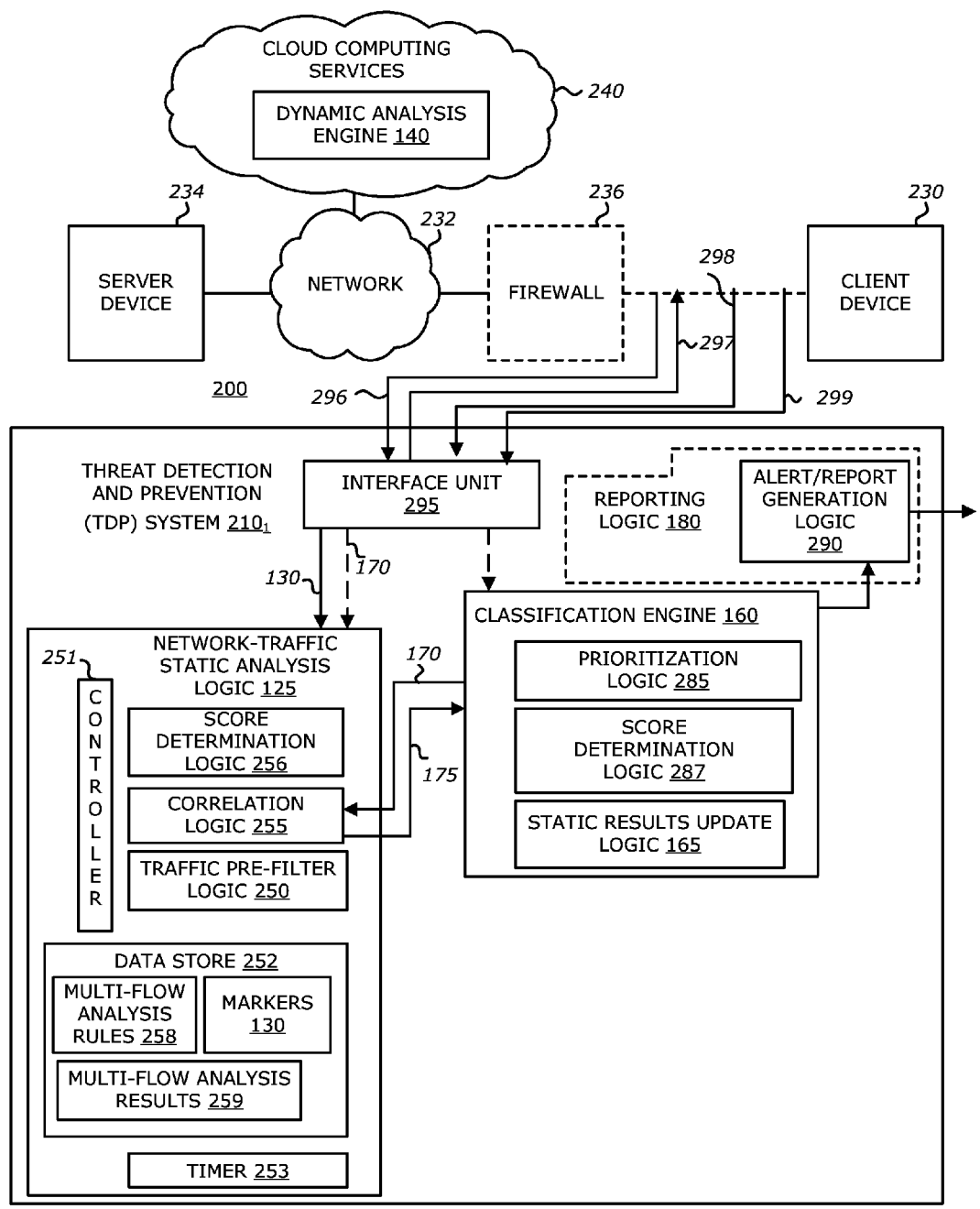
FIG. 2B is a second exemplary block diagram of a communication system deploying a plurality of threat detection and prevention (TDP) systems with a framework in which at least virtual machine (VM) analysis is conducted by cloud computing.

Additionally or in the alternative, the network-traffic static analysis logic 125 may be configured as a filtering device to determine if the multi-flow object 135 is to be provided for in-depth analysis by the dynamic analysis engine 140. The multi-flow object 135 may be provided to dynamic analysis engine 140, which comprises a virtual execution logic 274 as illustrated in FIGS. 2A-2B. The dynamic analysis engine 140 attempts to verify whether the suspect multi-flow object 135 is associated with a malicious attack (e.g., an exploit) through virtual processing of the suspect multi-flow object 135 and monitoring behaviors during such virtual processing, as described below.

The results 150 of this VM-based analysis (hereinafter "VM-based results") are output from the dynamic analysis engine 140 for subsequent use by correlation engine 160 in classifying whether the multi-flow object 135 is part of a malicious attack (e.g., an exploit). Although not illustrated in FIG. 1, the VM-based results 150 may include (1) the suspect multi-flow object 135; (2) an identifier assigned to the multi-flow object 135 (or perhaps identifiers associated to each flow of the multi-flow object 135); (3) time of analysis; (4) one or more scores that may be used to verify that the suspect multi-flow object 135 is likely an exploit, and if so: (i) detected anomalous behaviors; and/or (ii) name and/or version number of the software (e.g., operating system "OS" type and version; application type and version, etc.).

According to this embodiment of the disclosure, upon receipt of the VM-based results 150 and/or the multi-flow analysis results 175, the classification engine 160 determines whether the suspect multi-flow object 135 is malicious or benign and provides information that is used by the reporting logic 180 to generate a report 185 for at least identifying those suspect multi-flow objects that are determined to be malicious.

According to an embodiment of the disclosure, upon receipt of the VM-based results 150 without receipt of the multi-flow analysis results 175, the classification engine 160 may be configured to determine whether the suspect multi-flow object 135 is malicious or benign as described above. However, upon failing to classify the suspect multi-flow object 135 as an exploit (e.g., a computed score falls below a prescribed threshold), the static results update logic 165 in the classification engine 160 may be configured to generate a request message (multi-flow feedback signaling) 170 that prompts the network-traffic static analysis logic 125 to commence static analysis of characteristics associated with the multi-flow object 135 (hereinafter, "multi-flow analysis").

According to one embodiment, the multi-flow analysis may correspond to a first static analysis of the multi-flow object 135 (e.g., signature matching, heuristics, determinative analysis, etc.) with results 127 provided to classification engine 160 as shown in FIG. 2A. According to another embodiment, the multi-flow analysis may correspond to a second (enhanced) static analysis conducted on the multi-flow object 135 (e.g., additional signature matching, determinative analysis and/or heuristics; static analysis of different characteristics of the multi-flow object 135 that have not been previously considered such as markers 130, message ordering, message formatting, etc.) to verify whether the suspect multi-flow object 135 still should be considered as being associated with a malicious attack (e.g., an exploit).

Alternatively, the multi-flow analysis may be conducted in real-time, where the multi-flow feedback signaling 170 merely prompts for the return of the multi-flow analysis results 175 to the classification engine 160.

It is contemplated that the multi-flow analysis is directed to the multi-flow object 135, which may be the multi-flow object present at the first static analysis or a modified multi-flow object in which (i) one or more additional related messages associated with a flow of the multi-flow object or (ii) one or more additional related flows of the multi-flow object are received after the first static analysis.

The multi-flow analysis results 175 may be used, at least in part, to cause the classification engine 160 to conduct a secondary verification to determine whether the suspect multi-flow object 135 is associated with a malicious attack. According to one embodiment of the disclosure, the multi-flow analysis results 175 may include a value (e.g., a score) that represents the likelihood of the multi-flow object 135 being an exploit. Additionally or in the alternative, the multi-flow analysis results 175 may include anomalous characteristics detected during the multi-flow analysis. As yet another alternative embodiment, the multi-flow analysis results 175 simply may be a certain return value or an active logical signal that signifies that the network-traffic static analysis logic 125 detects the presence of one or more anomalous characteristics associated with the suspect multi-flow object 135 that signify an exploit.

Of course, when the multi-flow analysis results 175 include detected anomalous characteristics, it is contemplated that the network-traffic static analysis logic 125 may assign different weightings to different types of anomalous characteristics in order to avoid an unacceptable level of false positives (e.g., the presence of an executable with a response message may not be assigned a high threat level unless the type of response message normally has no executables, irregular message ordering may have a higher threat level than improper syntax in a particular message type, etc.). The weightings may be static in nature or may be dynamic for user customization.

In lieu of the classification engine 160 generating the multi-flow feedback signaling 170, it is contemplated that such signaling 170 may be produced by dynamic analysis engine 140. For instance, the dynamic analysis engine 140 may virtually process the suspect multi-flow object 135 and the monitored behaviors are provided to a score determination logic deployed therein. Where the resultant score fails to exceed a threshold value, the dynamic analysis engine 140 would transmit the multi-flow feedback signaling 170 to the network-traffic static analysis logic 125 to upload the multi-flow analysis results 175 to classification engine 160.

IV. Exemplary Architectures

Referring to FIG. 2A, an exemplary block diagram of a communication system 200 deploying a plurality of threat detection and prevention (TDP) systems $210_1$-$210_N$ (N>1, where N=3 for this embodiment and TDP system $210_1$ is equivalent to TDP system 100 of FIG. 1) communicatively coupled to a management system 220 via a network 225 is shown. In general, management system 220 is adapted to manage TDP systems $210_1$-$210_3$. For instance, management system 220 is responsible for updating software deployed within network-traffic static analysis logic 125 within TDP systems $210_1$. Such updating may be conducted automatically or conducted manually via uploads by an administrator. Also, such updating may be conducted freely among the TDP systems $210_1$-$210_3$ or subject to a subscription basis.

Herein, according to the embodiment illustrated in FIG. 2A, a first TDP system $210_1$ is an electronic device that is adapted to analyze information associated with network traffic from at least one client device 230 for transmission over a communication network 232, such as communications with server device 234. The communication network 232 may include a public network such as the Internet, in which case an optional firewall 236 (represented by dashed lines) may be interposed prior to accessing client device 230. Alternatively, the communication network 232 may be a private network such as a wireless data telecommunication network, wide area network, a type of local area network (LAN), or a combination of networks.

As shown, the first TDP system $210_1$ may be communicatively coupled with the communication network 232 via a network interface 238. In general, the network interface 238 operates as a data capturing device (sometimes referred to as a "tap" or "network tap") that is configured to receive data propagating to/from the client device 230 and provide at least some of this data to the first TDP system $210_1$ or a duplicated copy of the data. Alternatively, as shown in FIG. 2B, the first TDP system $210_1$ may be positioned behind the firewall 236 and in-line with client device 230.

According to an embodiment of the disclosure, the network interface 238 may be further configured to capture metadata from network traffic associated with client device 230. According to one embodiment, the metadata may be used, at least in part, to determine protocols, application types and other information that may be used by logic within the first TDP system $210_1$ to determine particular software profile(s). The software profile(s) are used for selecting and/or configuring a run-time environment in one or more virtual machines selected or configured as part of the dynamic analysis engine 140, as described below. These software profile(s) may be directed to different software or different versions of the same software application extracted from software image(s) fetched from storage device 265.

In some embodiments, although not shown, network interface 238 may be contained within the first TDP system $210_1$. In other embodiments, the network interface 238 can be integrated into an intermediary device in the communication path (e.g., firewall 236, router, switch or other networked electronic device, which in some embodiments may be equipped with SPAN ports) or can be a standalone component, such as an appropriate commercially available network tap.

As further shown in FIG. 2A, the first TDP system $210_1$ comprises static analysis engine 120, a scheduler 260, a storage device 265, dynamic analysis engine 140, classification engine 160, and reporting logic 180. Herein, the static analysis engine 120 comprises network-traffic static analysis logic 125, which may include one or more software modules that, when executed by one or more processors, analyzes characteristics of a multi-flow object. Such analysis may involve signature matching, determinative analysis and/or heuristics (as described above) as well as analysis of markers, namely stored information associated with characteristics of the multi-flow object that is generated based on the aggregation (or re-aggregation) of multiple related flows. These characteristics of the multi-flow object may include content within messages that are part of the multiple related flows, protocol, format, message ordering, or the like.

In general, referring to FIG. 2A, the network-traffic static analysis logic 125 is communicatively coupled to receive network traffic which may be multiple flows that are related to each other. For instance, a series of HTTP messages operating as multiple related flows may be routed over communication network 232. The network-traffic static analysis logic 125 comprises traffic pre-filter logic 250 that (i) parses the incoming network traffic, (ii) aggregates information associated with characteristics of the network traffic from the same client IP address (e.g., IP address of client device 230) for a given communication session, and (iii) stores the information associated with the characteristics (e.g., markers 130) within the data store 252. A controller 251 and timer 253 may be utilized for delimiting a session (e.g., period of time) during which related flows may be part of a particular multi-flow object 135.

A correlation logic 255 within the network-traffic static analysis logic 125 is configured to conduct a static analysis of content associated with the multi-flow object 135. For instance, according to one embodiment of the disclosure, the correlation logic 255 may be configured to analyze the markers 130 stored within the data store 252. As previously described, this static analysis may include checking for deviations in messaging practices set forth in applicable communication protocols (e.g., HTTP, TCP, etc.). For example, HTTP messages may be analyzed to determine compliance with certain message formats established for the protocol (e.g., out-of-order requests or responses). Furthermore, header or payload parameters of the HTTP messages may be analyzed to determine further compliance. Of course, in accordance with another embodiment of the disclosure, the correlation logic 255 may be configured to conduct a first static analysis (e.g., signature matching, deterministic analysis, heuristics, etc.) and conduct a second static analysis of the markers 130 upon receipt of notification that additional static analysis is needed by the classification engine 160.

When implemented, the score determination logic 256 may be configured to determine a probability (or level of confidence) that the multi-flow object 135 is associated with a malicious attack. More specifically, the score determination logic 256 may be configured to apply score values based, at least in part, on (i) pattern matches; (ii) heuristic or determinative analysis results; (iii) analyzed deviations in messaging practices set forth in applicable communication protocols (e.g., HTTP, TCP, etc.); (iv) analyzed compliance with certain message formats established for the protocol (e.g., out-of-order commands); and/or (v) analyzed header or payload parameters to determine compliance. Based on the analysis, score determination logic 256 may generate a score that may be part of the multi-flow analysis results 175, as described above and illustrated in FIG. 1.

Besides being configured to generate the multi-flow analysis results 175, the network-traffic static analysis logic 125 may route the suspect multiple-flow object 135 to dynamic analysis engine 140, which is configured to provide more in-depth analysis of multiple-flow object 135 analyzing its content in order to verify whether or not the suspect object 135 is an exploit. Information associated with the multi-flow object 135 may continue to be buffered in multi-flow data store 272 until expiration of the session time period.

More specifically, after analysis of the characteristics of the suspect multiple-flow object 135 has been completed, the network-traffic static analysis logic 125 may provide the object 135 to the dynamic analysis engine 140 for in-depth dynamic analysis by one or more virtual machines (VMs) $280_1$-$280_M$ (M>1) of the virtual execution logic 274. For instance, the virtual execution logic 274, operating in combination with processing logic 270 (described below), is adapted to simulate the transmission and/or receipt of signaling by a destination device represented by VM $280_1$ to replay in sequence protocol information associated with the related flows associated with the multi-flow object 135. Of course, if suspect object 135 is not suspected of being an exploit, the network-traffic static analysis logic 125 may simply denote that the suspect multi-flow object 135 is benign and refrain from passing the object 135 to the dynamic analysis engine 140 for analysis.

According to one embodiment, the scheduler 260 may be adapted to configure the VMs $280_1$-$280_M$ based on metadata associated with the multiple related flows of the multi-flow object 135 received by the network-traffic static analysis logic 125. For instance, the VMs $280_1$-$280_M$ may be configured with software profiles corresponding to the software images stored within storage device 265. As an alternative embodiment, the VMs $280_1$-$280_M$ may be configured according to one or more software configurations that are being used by electronic devices connected to a particular enterprise network (e.g., client device 230) or prevalent types of software configurations (e.g., a Windows® 7 OS; Internet Explorer® (ver. 10) web browser; Adobe® PDF™ reader application). As yet another alternative embodiment, the VMs $280_1$-$280_M$ may be configured to support concurrent virtual execution of a variety of different software configurations in efforts to verify that the suspect object is an exploit. Of course, it is contemplated that the VM configuration described above may be handled by logic other than the scheduler 260.

According to one embodiment of the disclosure, the dynamic analysis engine 140 is adapted to execute one or more VMs $280_1$-$280_M$ to simulate the receipt and execution of content associated with the multi-flow object 135 under analysis within a run-time environment as expected by the type of object. For instance, dynamic analysis engine 140 may optionally include processing logic 270 to emulate and provide anticipated signaling to the VM(s) $280_1$, . . . , and/or $280_M$ during virtual processing.

For example, the processing logic 270 may be adapted to provide, and sometimes modify (e.g., modify IP address, etc.) packets associated with the suspect multi-flow object 135 in order to control return signaling back to the virtual execution environment 276. Hence, the processing logic 270 may suppress (e.g., discard) the return network traffic so that the return network traffic is not transmitted to the communication network 232. According to one embodiment of the disclosure, for a particular suspect multi-object 135 being multiple related flows such as TCP or UDP flows, the processing logic 270 may be configured to send packets to the virtual execution environment 274 via a TCP connection or UDP session. Furthermore, the processing logic 270 synchronizes return network traffic by terminating the TCP connection or UDP session.

As further shown in FIG. 2A, the monitoring logic 278 within the virtual execution logic 274 may be configured to monitor behaviors of one or more VMs $280_1$, . . . , and/or $280_M$, such as VM $280_1$ configured to execute the suspect multi-flow object 135. This monitoring is conducted to detect anomalous (e.g., unexpected, irregular, etc.) activity indicative of an exploit. When anomalous activity is detected, the monitoring logic 278 operating with an optional score determination logic 282 may route the VM-based results 150 (e.g., computed score, information associated with the detected anomalous behaviors, and other information associated with the detected malicious activity by the suspect object) to classification engine 160.

It is noted that the score determination logic 282 may not be implemented within the dynamic analysis engine 140 so that the VM-based results 150 may exclude any scores, but rather includes information associated with the detected anomalous behaviors by the monitoring logic 278. The VM-based results 150 are subsequently weighted by the prioritization logic 285 and analyzed by the score determination logic 287 implemented within the classification engine 160.

In general, the classification engine 160 may be configured to receive the VM-based results 150. According to one embodiment of the disclosure, the classification engine 160 comprises prioritization logic 285 and score determination logic 287. The prioritization logic 285 may be configured to apply weighting to results provided from dynamic analysis engine 140 and/or network-traffic static analysis logic 125. These results may include a score produced by score determination logic 282. Alternatively, the results may include a score produced by score determination logic 282 and/or a score produced by score determination logic 256. Additionally or in the alternative, the results may include anomalous behaviors detected by monitoring logic 278 and/or anomalous characteristics detected by correlation logic 255.

The score determination logic 287 comprises one or more software modules that are used to determine a final probability as to whether the suspect multi-flow object is an exploit, and the resultant score representative of this final probability may be included as part of results provided to alert/report generation logic 290 within reporting logic 180.

According to one embodiment of the disclosure, where the score determination logic 287 has failed to determine that the suspect multi-flow object 135 based on the multi-flow analysis results 175 and/or the VM-based results 150, the classification engine 160 may refrain from providing the results to alert/report generation logic 290 or the results can be provided to alert/report generation logic 290 for processing to denote no detected exploit within the multiple related flows associated with the multi-flow object 135.

According to another embodiment of the disclosure, where the score determination logic 287 has failed to generate a score that signifies that the suspect multi-flow object 135 is malicious, static results update logic 165 may be configured to signal the network-traffic static analysis logic 125 via multi-flow feedback signaling 170 to modify the original multi-flow object by parsing and re-aggregating additional related messages associated with a flow that corresponds to the multi-flow object and/or re-aggregating additional related flows that correspond to the multi-flow object for storage in data store 252, where the additional related message and/or flow was processed after to particular activity (e.g., static analysis). The modified multi-flow object may be subsequently analyzed, where anomalies may be detected for the additional related messages/flows. Additionally or in the alternative, static results update logic 165 may be configured to (i) perform a static analysis (first or second (enhanced) static analysis) on information (e.g., markers 130) associated with the multi-flow object (original or modified) to generate the multi-flow analysis results 175; and/or (ii) provide the multi-flow analysis results 175 to the classification engine 160 or the dynamic analysis engine 140. The multi-flow analysis (e.g., analysis of the construct of the multi-flow object including messaging ordering, formats, etc.) may be conducted by the correlation logic 255.

For instance, the correlation logic 255 may be configured to analyze the markers 130 stored within the data store 252 as described above. In the event that deviations in the message formats and/or deviations in message ordering for example, the correlation logic 255 generates and outputs the multi-flow analysis results 175 to indicate to the prioritization logic 285, which may indicate that the network-traffic static analysis logic 125 has determined the presence of an exploit so as to alter the final score assigned by the score determination logic 287.

However, if the score determination logic 287 generates a final score representing that the suspect multi-flow object 135 has been verified by the virtual execution logic 274 as an exploit, information associated with the VM-based results 150 with or without multi-flow analysis results 175 may be provided to alert/report generation logic 290 and displayed accordingly.

Of course, in lieu of certain aspects of the multi-flow analysis being conducted by TDP systems $210_1$, it is contemplated that cloud computing services 240 may be implemented to handle such analysis (e.g., analysis of the characteristics of the suspect multi-flow object 135 as conducted by correlation logic 255). Additionally or in the alternative, cloud computing services 240 may be configured with virtual execution logic 274 that conducts virtual execution of the suspect multi-flow object 135, as described herein. In accordance with this embodiment, TDP system $210_1$ may be adapted to establish secured communications with cloud computing services 240 for exchanging information.

Referring now to FIG. 2B, first TDP system $210_1$ may be coupled with the communication network 232 in line with client device 230. Contrary to the embodiment illustrated in FIG. 2A, first TDP system $210_1$ comprises an interface unit 295 that directs signaling on communication network 232 to network-traffic static analysis logic 125 or classification engine 160, given that the dynamic analysis engine 140 is deployed as part of the cloud computing services 240. Hence, multiple flows associated with network traffic are routed to network-traffic static analysis logic 125 via communication path 296. The suspect multi-flow objects may be routed via path 297 to the dynamic analysis engine 140 being part of the cloud computing services 240. Similarly, related flows that are not determined to be at least "suspect" may be returned via path 297 for continued routing to client device 230.

The results of the dynamic analysis engine 140 (e.g., exploit information) may be routed via path 298 to the classification engine 160. The score determination logic 287 is configured to generate a score that may classify the threat of the possible exploit. According to one embodiment of the disclosure, where the score falls below a prescribed threshold, normally where the score determination logic 287 has failed to determine that the suspect multi-flow object 135 is malicious, the classification engine 160 may send multi-flow feedback signaling 170 to the network-traffic static analysis logic 125 to (i) modify the original multi-flow object, (ii) perform a static analysis, and/or (iii) provide the multi-flow analysis results 175 as described above.

In the event of message deviations, such as deviations in format and/or ordering for example, the correlation logic 255 generates multi-flow analysis results 175, which are returned to classification engine 160. Thereafter, the prioritization logic 285 applies selected weighting to the inputs, namely the VM-based results 150 and the multi-flow analysis results 175, which may alter the final score assigned by the score determination logic 287 to identify that the multi-flow object 135 is malicious.

Of course, where the score determination logic 287 is implemented within the dynamic analysis engine 140, the multi-flow feedback signaling 170 may be provided directly from the dynamic analysis engine 140 via path 299. Upon determining that the suspect multi-flow object 135 is malicious, the correlation logic 255 generates multi-flow analysis results 175 that are provided as input to the prioritization logic 285 for weighting, which may alter the final score assigned by the score determination logic 287 to identify whether the multi-store object 135 is malicious or not.

V. Exemplary Logic Layout of TDP System

Figure 3:
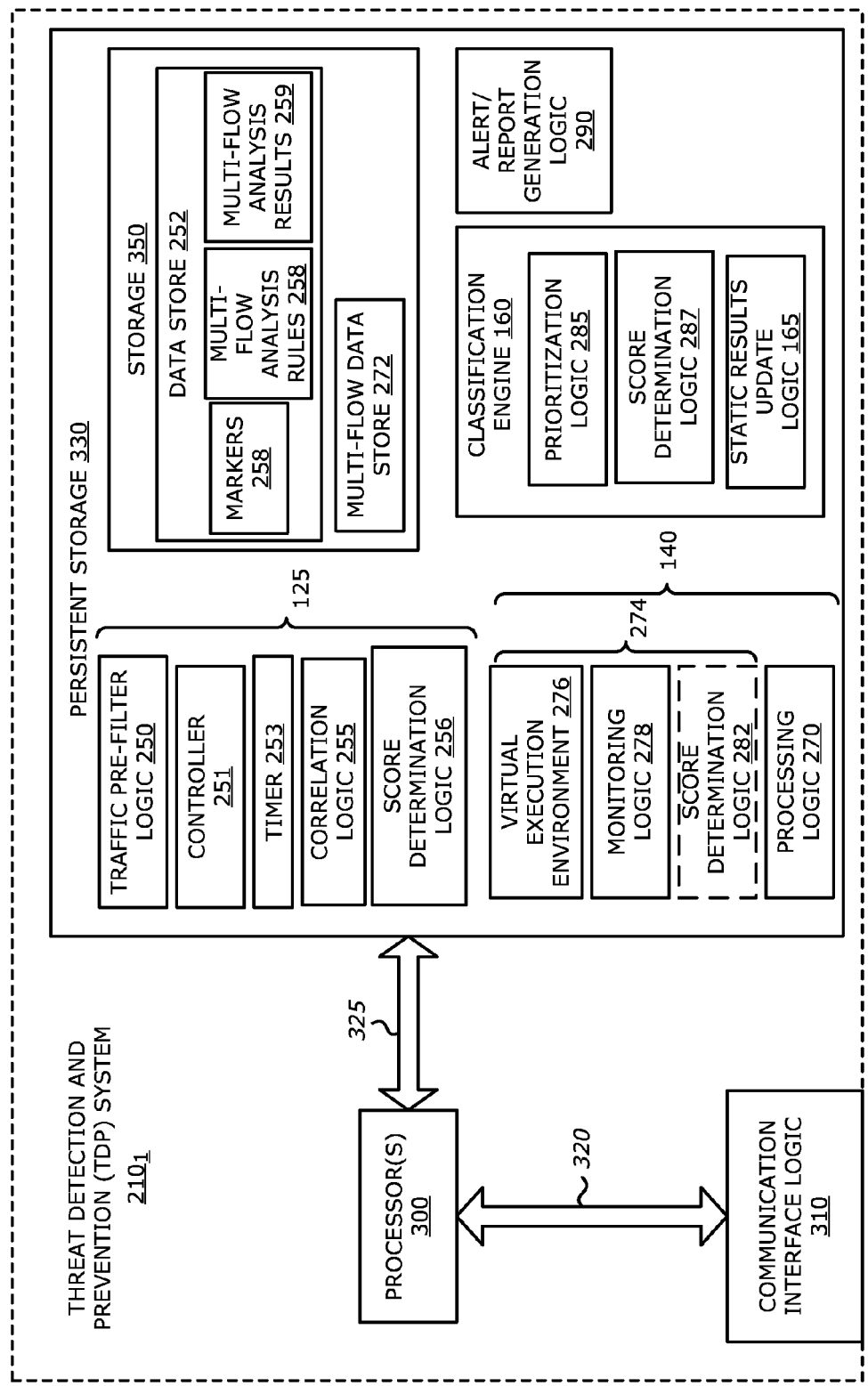
FIG. 3 is an exemplary block diagram of logic associated with the TDP system of FIGS. 2A-2B.

Referring now to FIG. 3, an exemplary block diagram of logic associated with TDP system 210$_1$ of FIGS. 2A-2B is shown. TDP system 210$_1$ comprises one or more processors 300 that are coupled to communication interface logic 310 via a first transmission medium 320. Communication interface logic 310 enables communications with other TDP systems 210$_2$-210$_3$ and management system 220 of FIG. 2A-2B. According to one embodiment of the disclosure, communication interface logic 310 may be implemented as a physical interface including one or more ports for wired connectors. Additionally, or in the alternative, communication interface logic 310 may be implemented with one or more radio units for supporting wireless communications with other electronic devices.

Processor(s) 300 is further coupled to persistent storage 330 via transmission medium 325. According to one embodiment of the disclosure, persistent storage 330 may include (a) network-traffic static analysis logic 125, including traffic pre-filter logic 250 and correlation logic 255; (b) the dynamic analysis engine 140 that comprises virtual execution logic 270, the monitoring logic 278 and/or an optional score determination logic 282; (c) classification engine 160 including prioritization logic 285, score determination logic 287 and static results update logic 165; (d) alert report/generation logic 290; and (e) data stores 252 and 272. Of course, when implemented as hardware, one or more of these logic units could be implemented separately from each other.

Traffic pre-filter logic 250 comprises one or more software modules that parse the incoming network traffic, aggregate (or re-aggregate) information associated with network traffic from/to the same client IP address (e.g., IP address of client device 230) for a given communication session, and store the information (e.g., markers 130) within data store 252.

Controller 251, operating in combination with timer 253, controls the traffic filter logic 250 to assist in delimiting the given communication session so that the communication session may not extend beyond time period "T". Hence, the controller 251 and/or timer 253 ensure that the multi-flow object 135 comprises related flows in close temporal proximity.

According to one embodiment, correlation logic 255 is configured to analyze the characteristics of the multi-flow object 135, namely multiple related flows, based on analysis rules 258. This multi-flow analysis may involve accessing the stored markers 130, namely information associated with characteristics of the multiple related flow forming the multi-flow object, and determining if the markers 130 indicate any abnormalities in the content within the multi-flow object (e.g., message formatting informalities, presence of executables, message ordering, etc.). The results 259 of the multi-flow analysis may be stored in data store 252.

Score determination logic 256 is an optional component that may operate in combination with the correlation logic 255 to produce a score that may be weighted by classification engine 160 in determining if the suspect multi-flow object is part of a malicious attack.

Virtual execution environment 276 comprises one or more software modules that are used for performing an in-depth, dynamic and/or real-time analysis of the suspect object using one or more VMs. More specifically, the virtual execution environment 276 is adapted to run the VM(s), which virtually process the content associated with the suspect multi-flow object by simulating transmission and/or receipt and execution of such content in order to determine the presence of one or more exploits.

Furthermore, the monitoring logic 278 monitors behaviors for each flow of the suspect multi-flow object processed by the VM(s) in real-time and may also log at least anomalous behaviors by the VM(s) configured with certain software and features that are presumably targeted by the matched exploit. In essence, the monitoring logic 278 identifies the effects that the suspect multi-flow object would have had on a physical electronic device with the same software/feature configuration. Such effects may include at least unusual attempted network transmissions, unusual changes in performance, and the like.

Thereafter, according to the observed behaviors of the virtually executed object that are captured by the monitoring logic 278, the score determination logic 282, when deployed within the dynamic analysis engine 140, determines whether the multi-flow object is associated with one or more exploits. This may be accomplished by analysis of the severity of the observed anomalous behaviors and/or the likelihood of the anomalous behaviors result from an exploit, is evaluated and reflected in a "score". As a result, this logic collectively outputs the VM-based results 150 for use by classification engine 160.

The prioritization logic 285 comprises one or more software modules that are used for weighting information associated with results (e.g., VM-based results 150 and/or multi-flow analysis results 175). For instance, the prioritization logic 285 may assign a higher priority (and larger weight) to either the VM-based results 150 or the multi-flow analysis results 175. For instance, the scores generated by score determination logic 256 and/or score determination logic 282 may be weighted differently so that one of these scores is given a higher priority than the other. Alternatively, if implemented to receive the anomalous characteristics and behaviors as part of VM-based results 150 and/or multi-flow analysis results 175, the prioritization logic 285 may be configured to apply different weights to the monitored anomalous characteristics and behaviors.

The score determination logic 287 may be adapted to receive both the VM-based results 150 and multi-flow analysis results 175 along with weighting provided by prioritization logic 285. Based on these results, the score determination logic 287 generates a "final score" that signifies whether the suspect object is determined to be part of a malicious attack (e.g., an exploit) or benign.

Alternatively, the score determination logic 287 may be adapted to receive the VM-based results 150 along with weighting provided by prioritization logic 285 and, based on the score and/or observed anomalous behaviors, generates a "score" that signifies whether the suspect object is determined to be part of a malicious attack (e.g., an exploit) or benign. Where the suspect object is initially determined to be benign (i.e. no exploit), the static results update logic 165 may be adapted to signal the correlation logic 255 of the network-traffic static analysis logic 125 to provide the multi-flow analysis results 175 for use in verifying the presence of an exploit within the suspect multi-flow object as described above. It is contemplated that, in lieu of sending the multi-flow analysis results 175 automatically, the network-traffic static analysis logic 125 may only send these results 175 to classification engine 160 if such results are determined by the network-traffic static analysis logic 125 to potentially alter the conclusion reached by the score determination logic 287.

Continuing the above example, processor(s) 300 may invoke alert report/generation logic 290, which produces alerts which may include a detailed summary of at least the exploit detected by the TDP system $210_1$. Furthermore, the alert/report generation logic 290 (or a separate signature generation logic (not shown) located within or remote from the TDP system $210_1$) may generate an indicator or signature for any detected malware, which may be based on and in some cases incorporate one or more markers from the static analysis and enhanced static analysis, if conducted, and/or behaviors from the dynamic analysis. The signatures may be used to block subsequent malicious traffic at the TDP system $210_1$ (FIG. 2A) or distributed, e.g., via management system 220 (FIG. 2A), to and used to block subsequent malicious traffic at other TDP systems (e.g., TDP systems $210_2$, $210_3$ of FIG. 2A).

VI. Exemplary Threat Detection and Prevention Processes

Figure 4A:
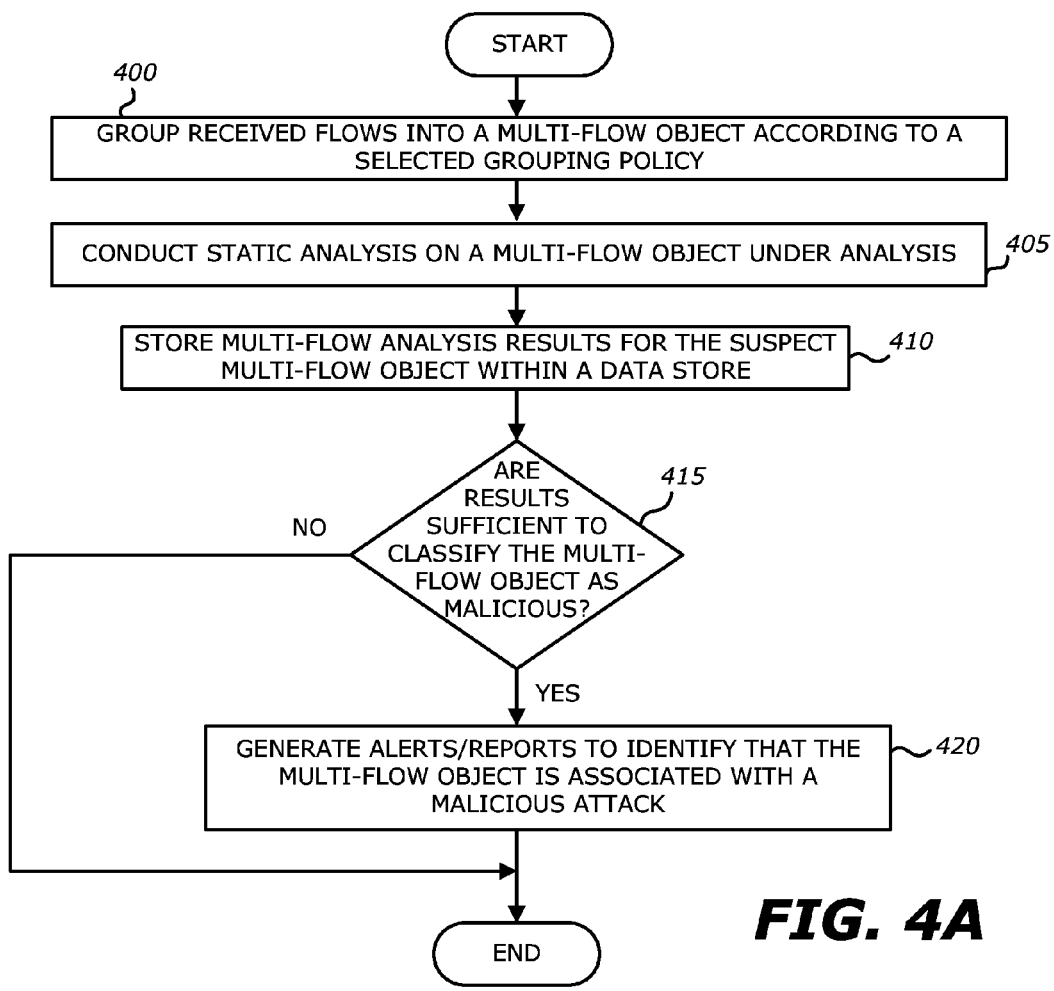
FIG. 4A is a flowchart illustrating a first exemplary threat detection and prevention process.

Referring to FIG. 4A, a general exemplary flowchart illustrating a threat detection and prevention process is shown, where multi-flow analysis is conducted to determine whether a multi-flow object is malicious. First, information associated with a plurality of flows is grouped (e.g., aggregated by the pre-filter) to produce a multi-flow object (block 400). This grouping is conducted in accordance with a selected grouping policy. For instance, multiple related flows may be grouped according to their originating source (client) IP address over a predetermined period of time "T".

Thereafter, a static analysis is conducted on the multi-flow object, where the characteristics of the multi-flow object are analyzed for use in determining if the multi-flow object is a part of a malicious attack, such as an exploit (block 405). Examples of characteristics of the multi-flow object being analyzed may include, but is not limited or restricted to the construct of the messages being part of the multiple related flows (e.g., header types, header order, parameter values for corresponding headers within HTTP-based message, etc.), message ordering, and/or protocol information associated with HTTP-based messages formulating the flows. Additionally, information directed to the particular type of object (e.g., HTML, PDF, executable, etc.) may be used as part of the characteristics of the multi-flow object.

The multi-flow analysis results are subsequently stored within a data store (block 410). Based on at least the multi-flow analysis results for the suspect multi-flow object, a determination is made as to whether these results are sufficient to classify the multi-flow object as malicious (block 415). If so, an alert and/or report may be generated to identify that the multi-flow object is associated with a malicious attack (block 420).

Figure 4B:
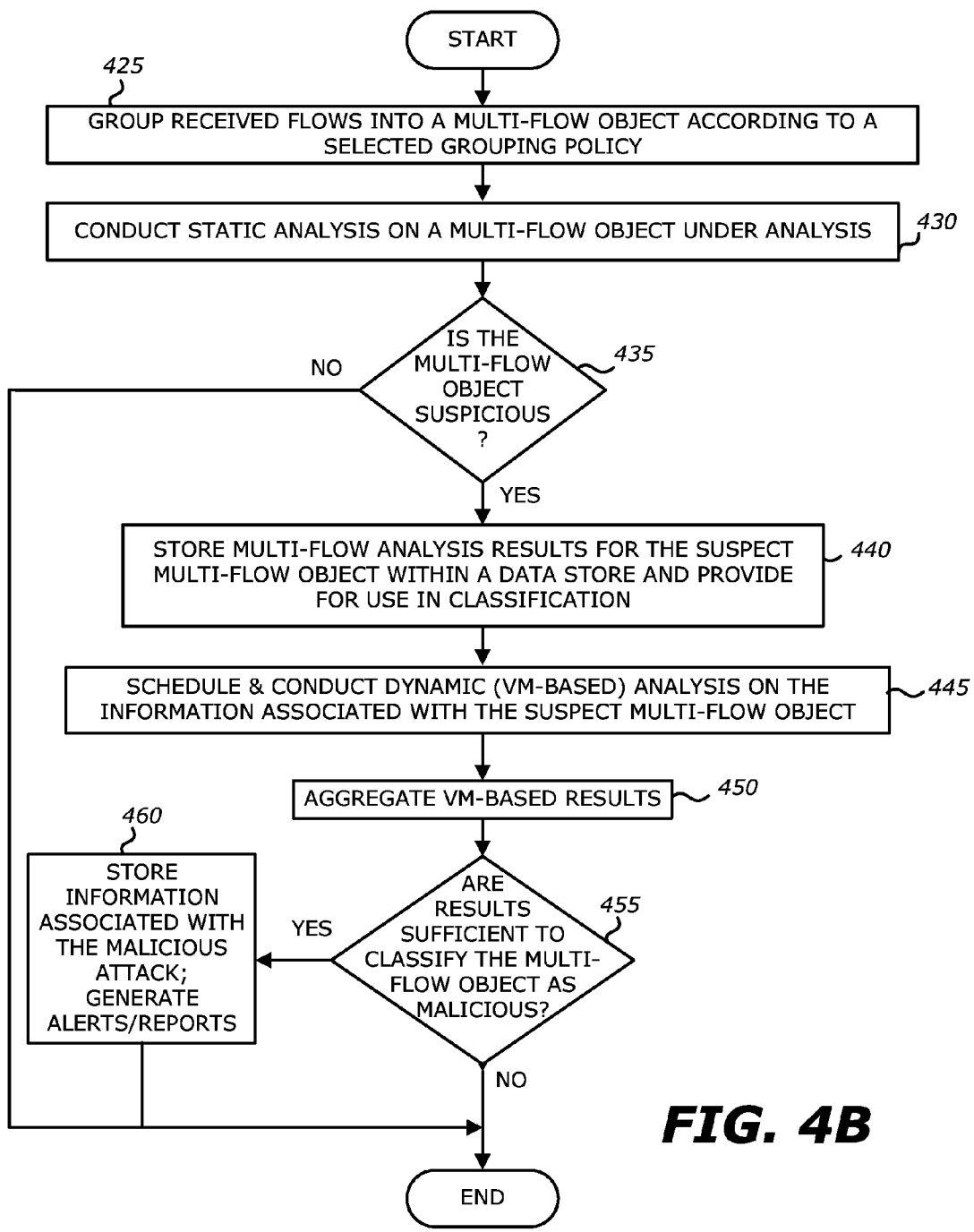
FIG. 4B is a flowchart illustrating a second exemplary threat detection and prevention process.

Referring to FIG. 4B, a flowchart illustrating a second exemplary threat detection and prevention process is shown, where both static and dynamic multi-flow analysis is conducted to determine whether a multi-flow object is malicious. First, information associated with a plurality of flows is grouped (e.g., aggregated) to produce a multi-flow object (block 425). This grouping is conducted in accordance with a selected grouping policy as described above. Second, a static analysis is conducted on the multi-flow object, where the characteristics of the multi-flow object (as described above for FIG. 4A) are analyzed for use in determining if the multi-flow object is a part of a malicious attack, such as an exploit for example (block 430). Such analysis produces the multi-flow analysis results described above.

Based at least in part on the multi-flow analysis results for the suspect multi-flow object, a determination is made as to whether the multi-flow object is "suspicious," namely the characteristics of the multi-flow object tends to suggest that the object is part of a malicious attack (block 435). If so, the multi-flow analysis results for the suspect multi-flow object are subsequently stored within a data store and provided for use in classifying the multi-flow object as malicious or benign (block 440).

Furthermore, dynamic (VM-based) analysis is scheduled and performed on information associated with the suspect multi-flow object to produce VM-based results (blocks 445 and 450). Based on both the multi-flow analysis results and the VM-based results, a determination is made as to whether the multi-flow object should be classified as being part of a malicious attack as set forth in block 455. If so, information associated with the malicious attack is stored and an alert and/or report may be generated to identify that the multi-flow object is associated with a malicious attack (block 460). Otherwise, the suspect multi-flow object is concluded as being benign.

Figure 4C:
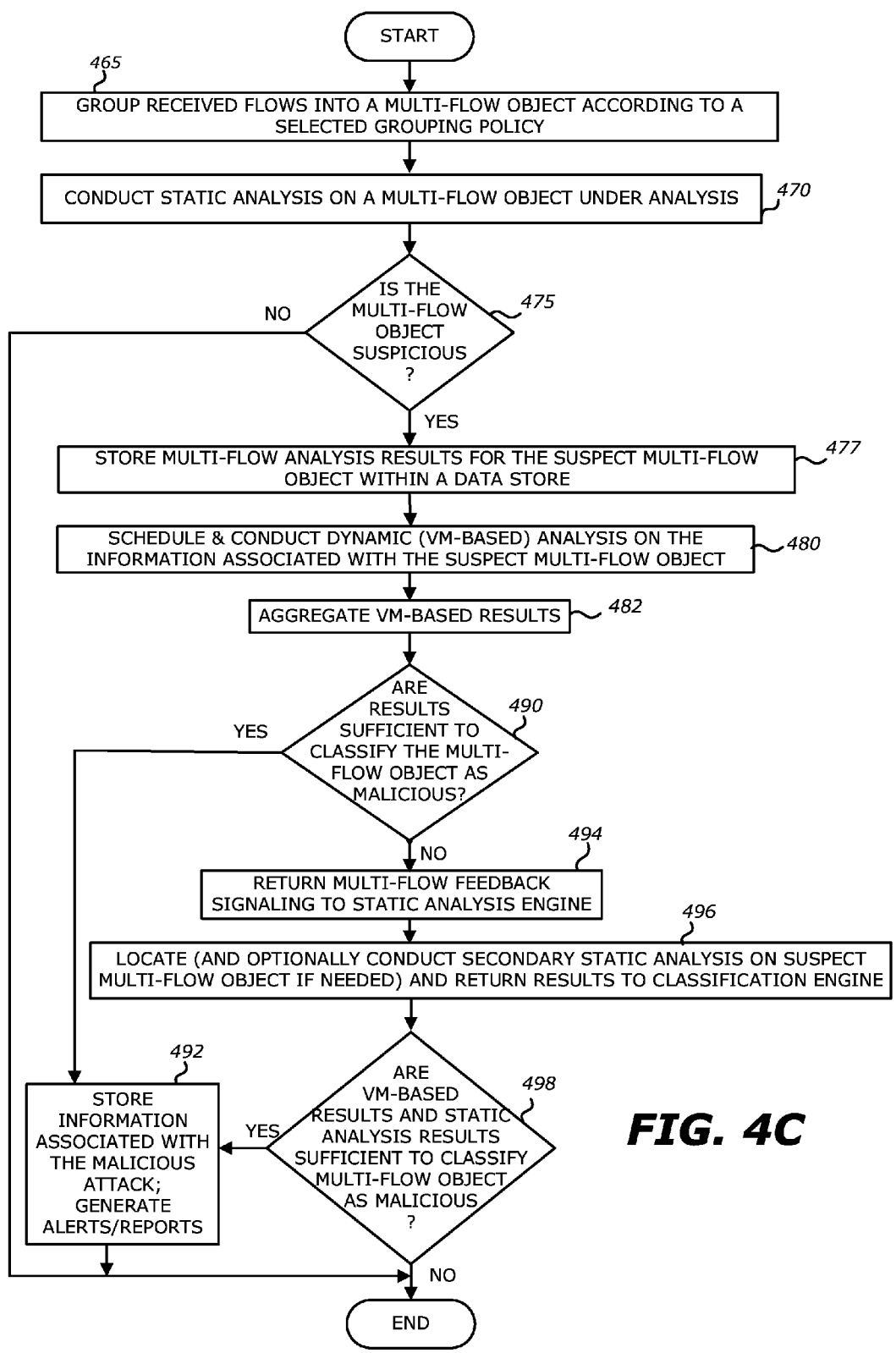
FIG. 4C is a flowchart illustrating a third exemplary threat detection and prevention process.

Referring to FIG. 4C, a flowchart illustrating a third exemplary threat detection and prevention process is shown, where dynamic multi-flow analysis is conducted to determine whether a suspect multi-flow object is malicious and, upon failing to verify that the suspect multi-flow object is malicious, considering the static multi-flow analysis conducted by the network-traffic static analysis logic.

Herein, information associated with a plurality of flows is grouped (e.g., aggregated) to produce a multi-flow object (block 465). This grouping is conducted in accordance with a selected grouping policy, as described in FIG. 4A. However, where the static analysis is conducted prior to the elapse of time period T, information associated with flows that are part of the multi-flow object may be stored in the event that additional static analysis is needed.

During or after grouping, at time "t" (during or at end of time period T), a static analysis is conducted on the multi-flow object, where the characteristics of the multi-flow object (as described above) are analyzed for use in determining if the multi-flow object under analysis is a part of a malicious attack, such as an exploit (block 470). Such analysis produces multi-flow analysis results.

Based at least in part on the multi-flow analysis results for the suspect multi-flow object, a determination is made as to whether the multi-flow object is "suspicious," namely the characteristics of the multi-flow object tends to suggest that the object is part of a malicious attack (block 475). If so, the multi-flow analysis results for the suspect multi-flow object are subsequently stored within a data store and provided for use in classifying the multi-flow object as malicious or benign (block 477).

Additionally, dynamic (VM-based) analysis is scheduled and performed on information associated with the suspect multi-flow object to produce the VM-based results (blocks 480 and 482). Based on the VM-based results, a determination is made as to whether the multi-flow object should be classified as being part of a malicious attack (e.g., indicative of an exploit) as set forth in block 490. If so, information associated with the malicious attack is stored and an alert and/or report may be generated to identify that the multi-flow object is associated with a malicious attack (block 492). Otherwise, multi-flow feedback signaling is provided to the network-traffic static analysis logic that conducted a second static analysis of the multi-flow object (block 494). The second (enhanced) static analysis may analyze the information associated with additional message(s)/flow(s) that were not analyzed during the prior static analysis of the multi-flow object and/or may analyze different types of information (e.g., markers in lieu of signature matching conducted in the first static analysis, etc.). Thereafter, the multi-flow analysis results for the suspect multi-flow object are returned to the classification engine which, based on both the VM-based results and the multi-flow analysis results, determines whether the multi-flow object should be classified as being part of a malicious attack (e.g., indicative of an exploit) or not (see blocks 496 and 498).

Where the multi-flow object should be classified as being part of a malicious attack, information associated with the malicious attack is stored and an alert and/or report may be generated to identify that the multi-flow object is associated with a malicious attack (block 492). Otherwise, the suspect multi-flow object is concluded as being benign.

VII. Illustrative Example

Figure 5A:
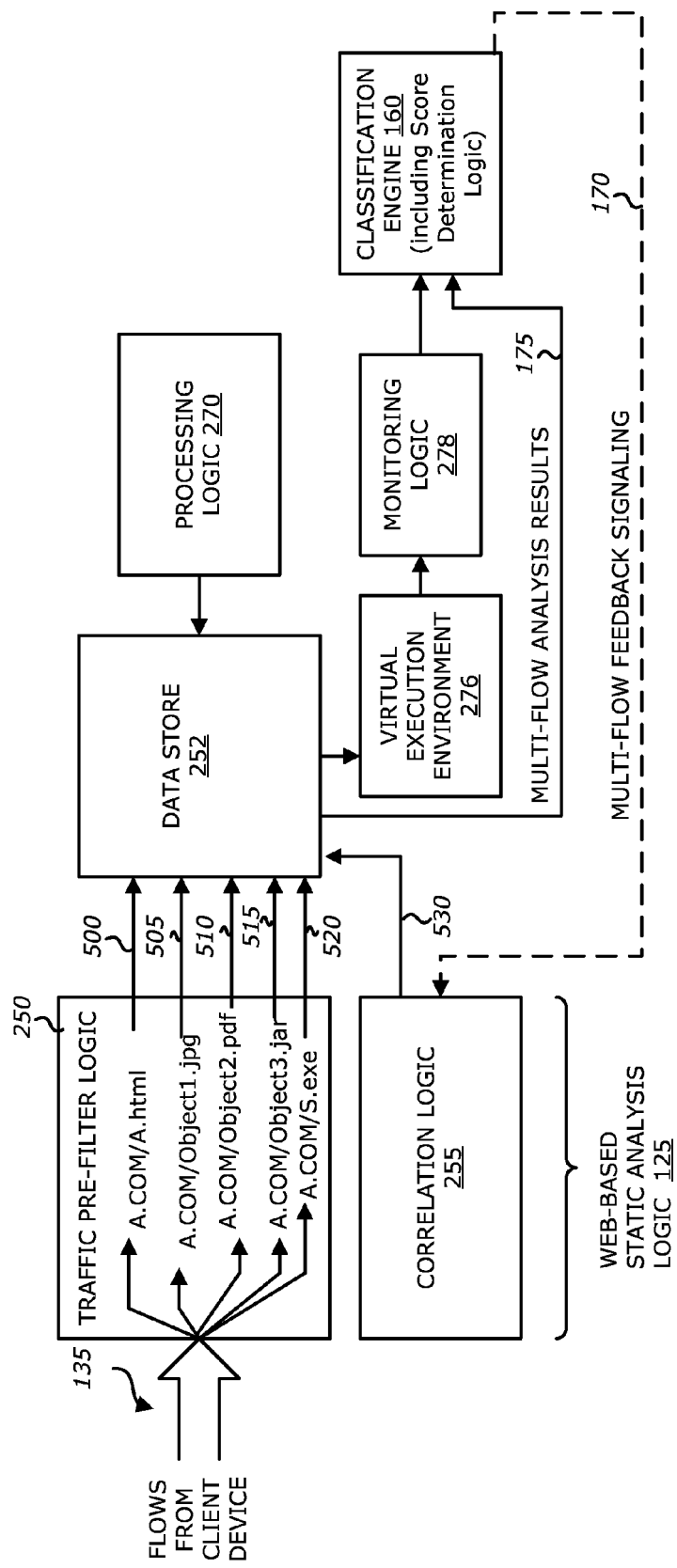
FIGS. 5A-5B are illustrative embodiments of the operations of the TDP system of FIGS. 2A-2B.
Figure 5B:
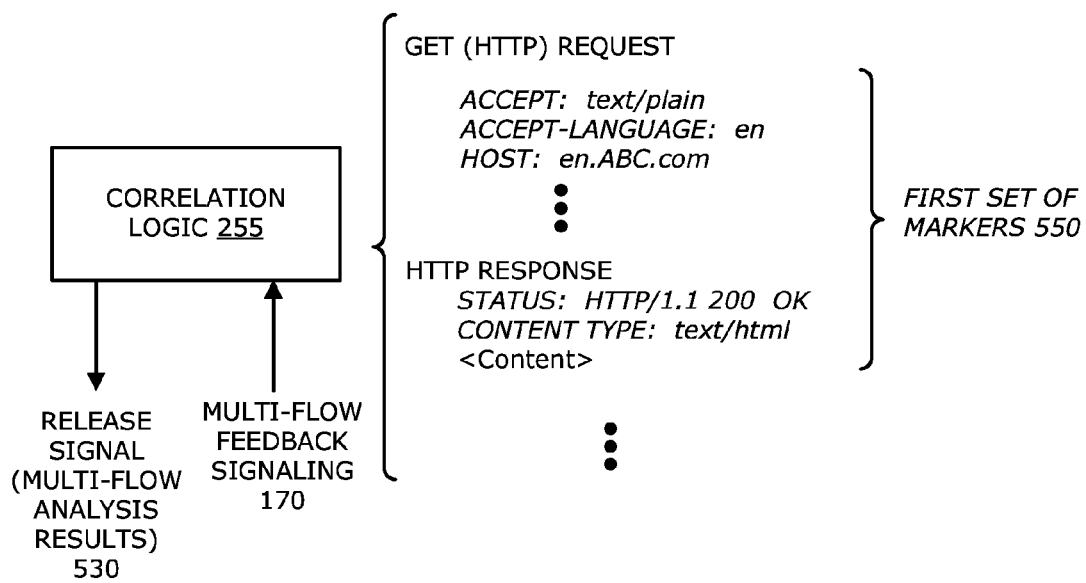

Referring to FIGS. 5A-5B, an illustrative example of the operations conducted by the threat detection and prevention process, where traffic pre-filter logic 250 and correlation logic 255 collectively generate a multi-flow object based on multiple related flows and performs static analysis operations on the multi-flow object for use in determining whether the multiple related flows are associated with a malicious attack by featuring one or more exploits.

As shown, the traffic pre-filter logic 250 monitors flows from/to a client device. Multiple flows may constitute a single object, especially where these flows are initiated from an outgoing request message. For instance, as shown, the user for the client device initiates a HTTP Get Request for the company A's website (A.com—flow 1), and in response, receives an HTTP Response with the content associated with the webpage for company A (A.HTML—flow 1), as represented by flow 500. Without user initiation, return of the A.HTML prompts the browser located in the client device to initiate a request for different objects such as the following: (1) a JPEG object (A.com/Object1.jpg—flow 2 505); (2) a PDF file (A.com/Object2.pdf—flow 3 510); and (3) a JAR file to support Java®-based communications (A.com/Object3.jar —flow 4 515). Lastly, an executable is provided as part of the flow (e.g., flow 5 520). Flows 1-5 500-520 are part of the same multi-flow object.

The characteristics 530 of the multi-flow object, which is associated with multiple related flows 500-520, are analyzed by correlation logic 255. The results of the analysis are stored in data store 252. The results may be data that is subsequently processed to generate a score, where the score and data are provided as the multi-flow analysis results. These results may be provided in real-time or in response to a triggering event from the classification engine 160 as shown in FIG. 5A.

As shown in FIG. 5B, the characteristics of the multi-flow object may be represented as a first set of markers 550, namely information associated with the fields within headers of the HTTP GET Request. The first set of markers 550 further comprise information associated with the fields within the headers of subsequent HTTP Request and/or Response messages.

Referring back to FIG. 5A, upon determining that the suspect multi-flow object has not been detected as being malicious, the classification engine 160 notifies the network-traffic static analysis logic 125 of a missed detection via multi-flow feedback signaling 170. The missed detection may be due to a variety of reasons, including insufficient duration for analysis (e.g., time delayed exploits), software run on the VM(s) does not activate the exploit (S.exe of FIG. 5A), or the like.

Upon learning that the suspect multi-flow object failed VM-diagnostics, the network-traffic static analysis logic 125 returns multi-flow analysis results 175 to classification engine 160 for subsequent determination if the suspect multi-flow object should be determined as an exploit. Of course, the multi-flow analysis results 175 may include a generated score and anomalous characteristics uncovered for the multi-flow object 135 or may be as simple as an active signal (logic "1"). Depending on the weighting applied to the multi-flow analysis results 175, the classification engine 160 may now classify the multi-flow object 135 as malicious.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An apparatus for detecting one or more exploits, comprising:
   one or more hardware ports that provide connectivity between the apparatus and a transmission medium;
   network-traffic static analysis logic communicatively coupled to the one or more hardware ports, the network-traffic static analysis logic to conduct an analysis of a multi-flow object based on information from a plurality of related flows received via the one or more hardware ports by analyzing characteristics of the multi-flow object and determining if the characteristics of the multi-flow object are indicative of an exploit of the one of more exploits, wherein the analysis of the multi-flow object represents a static analysis of characteristics associated with the plurality of related flows and each flow of the plurality of related flows comprises one or more related messages communicated during a single communication session between a source network device and a destination network device; and
   a classification engine to receive results of the analysis of the multi-flow object and, based on the results of the analysis of the multi-flow object, determine whether the multi-flow object is the exploit.

2. The apparatus of claim 1, wherein the characteristics comprises message ordering within a plurality of related flows associated with the multi-flow object, wherein each flow of the plurality of related flows comprises the one or more related messages that include a plurality of related messages communicated during the single communication session between the source network device being a single source network device and the destination network device being a single destination network device.

3. The apparatus of claim 1, wherein the characteristics comprise one or more of (i) header types within HTTP-based messages associated with the multi-flow object; (ii) parameter values for corresponding headers within the HTTP-based messages; or (iii) ordering of information associated with the HTTP-based messages associated with the multi-flow object.

4. The apparatus of claim 1, wherein the analysis of the multi-flow object corresponds to an enhanced static analysis of characteristics associated with the multi-flow object that are different from characteristics analyzed by the network-traffic static analysis logic during a first static analysis of the multi-flow object prior to the enhanced static analysis.

5. The apparatus of claim 1 further comprising:
a dynamic analysis engine including at least one virtual machine configured to conduct virtual processing of information within the multi-flow object, the dynamic analysis engine further (i) monitoring behaviors of the multi-flow object during the virtual processing by the at least one virtual machine and (ii) generating results based on the monitored behaviors,
wherein the classification engine uses the results generated from the dynamic analysis engine and the results of the analysis of the multi-flow object by the network-traffic static analysis logic to determine whether the multi-flow object is the exploit.

6. The apparatus of claim 5, wherein the analysis of the multi-flow object by the network-traffic static analysis logic is triggered by a feedback signal and feedback signal is triggered when the classification engine determines that the results from the dynamic analysis engine fail to identify the multi-flow object is the exploit.

7. The apparatus of claim 1, wherein the multi-flow object includes at least a first data flow of the plurality of related data flows and a second data flow of the plurality of related data flows that is responsive to the first data flow, the first data flow including information associated with a HTTP GET request message and the second data flow including information associated with a HTTP GET response message.

8. An apparatus comprising:
a processor; and
a memory communicatively coupled to the processor, the memory comprises
a network-traffic static analysis logic being a software module that, when executed by the processor, conducts an analysis of a multi-flow object by analyzing characteristics of the multi-flow object that include message ordering within a plurality of related flows associated with the multi-flow object and determining if the characteristics of the multi-flow object are associated with a malicious attack, wherein the multi-flow object includes an aggregation of a plurality of related flows and each flow of the plurality of related flows comprises one or more related messages communicated during a single communication session between a source network device and a destination network device, and a classification engine being a software module that, when executed by the processor, receives results of the analysis of the multi-flow object and, based on the results of the analysis of the multi-flow object, determines whether the multi-flow object is associated with the malicious attack.

9. The apparatus of claim 8, wherein the characteristics comprise one or more of (i) header types within HTTP-based messages associated with the multi-flow object; (ii) parameter values for corresponding headers within the HTTP-based messages; or (iii) ordering of information associated with the HTTP-based messages associated with the multi-flow object.

10. The apparatus of claim 8, wherein the analysis of the multi-flow object by the network-traffic static analysis logic is triggered by communications from the classification engine.

11. The apparatus of claim 8, wherein the analysis of the multi-flow object represents an enhanced static analysis of characteristics associated with a plurality of related flows of the multi-flow object that are different than characteristics analyzed and reported by the network-traffic static analysis logic to the classification engine prior to the enhanced static analysis, wherein each flow of the plurality of related flows comprises the one or more related messages being a plurality of related messages communicated during the single communication session between the source network device being a single source network device and the destination network device being a single destination network device.

12. The apparatus of claim 8, wherein the memory further comprises:
a dynamic analysis engine being a software module that, when executed by the processor, causes at least one virtual machine to conduct virtual processing of information within the multi-flow object, the dynamic analysis engine further (i) monitoring behaviors of the multi-flow object during the virtual processing by the at least one virtual machine and (ii) generating results based on the monitored behaviors,
wherein the classification engine uses the results generated from the dynamic analysis engine and the results of the analysis of the multi-flow object by the network-traffic static analysis logic to determine whether the multi-flow object is associated with the malicious attack.

13. The apparatus of claim 12, wherein the analysis of the multi-flow object by the network-traffic static analysis logic is triggered by a feedback signal and the feedback signal is triggered when the classification engine determines that the results from the dynamic analysis engine fail to identify the multi-flow object is associated with the malicious attack.

14. The apparatus of claim 8, wherein the analysis of the multi-flow object by the network-traffic static analysis logic is triggered by a feedback signal and the feedback signal is triggered when the classification engine fails to identify the multi-flow object is associated with the malicious attack.

15. The apparatus of claim 8, wherein the multi-flow object includes at least a first data flow of the plurality of related data flows and a second data flow of the plurality of related data flows that is responsive to the first data flow, the first data flow including information associated with a HTTP GET request message and the second data flow including information associated with a HTTP GET response message responsive to the HTTP GET request message.

16. An electronic device, comprising: one or more hardware ports that provide connectivity between the apparatus and a transmission medium; network-traffic static analysis logic communicatively coupled to the one or more hardware ports, the network-traffic static analysis logic to conduct a first analysis of a multi-flow object based on information from a plurality of related flows received via the one or more hardware ports to determine if the multi-flow object has characteristics associated with a malicious attack, wherein the multi-flow object includes an aggregation of the plurality of related flows and each flow of the plurality of related flows comprises one or more related messages communicated during a single communication session between a source network device and a destination network device; a dynamic analysis engine including at least one virtual machine configured to process information within the multi-flow object determined by the first analysis as having characteristics associated with the malicious attack, the dynamic analysis engine further (i) monitoring behaviors of the multi-flow object during the virtual processing by the at least one virtual machine and (ii) generating results based on the monitored behaviors; and a classification engine to receive the results from the dynamic analysis engine and to generate a feedback signal that is provided to the network-traffic static analysis logic in response to a triggering event, the feedback signal prompting the network-traffic static analysis logic to perform a second analysis of the multi-flow object and provide results of the second analysis to the classification engine.

17. The electronic device of claim 16, wherein each flow of the plurality of related flows comprises the one or more related messages that include a plurality of related messages communicated during the single communication session between the source network device being a single source network device and the destination network device being a single destination network device.

18. The electronic device of claim 17, wherein the static analysis of the characteristics related to the communication protocols comprises analysis of one or more of (i) header types within the plurality of related messages being HTTP-based messages; (ii) parameter values for corresponding headers within the HTTP-based messages; or (iii) ordering information associated with the HTTP-based messages.

19. The electronic device of claim 16, wherein the first analysis analyzes characteristics of the multi-flow object different from characteristics of the multi-flow object analyzed during the second analysis.

20. The electronic device of claim 19, wherein the first analysis comprises one of a heuristic analysis, a determinative analysis, or a signature matching.

21. The electronic device of claim 19, wherein the first analysis conducts signature matching associated with a first subset of signatures and the second analysis conducts signature matching associated with a second subset of signatures that is mutually exclusive from the first subset of signatures.

22. The electronic device of claim 19, wherein the results of the second analysis including one or more of (i) a score based on anomalous characteristics detected during the second analysis of the multi-flow object, (ii) the anomalous characteristics, or (iii) an updated score different than the score if (a) the first analysis of the multi-flow object produced a first score used by the classification engine to classify the multi-flow object as malicious or benign and (b) the second analysis is directed to the multi-flow object that includes additional information that was not analyzed during the first analysis.

23. The electronic device of claim 19, wherein the network-traffic static analysis logic comprises:

a traffic pre-filter logic configured to (i) parse incoming network traffic, and (ii) aggregate information associated with the network traffic from a common Internet Protocol (IP) address for a period of time, the aggregated information being associated with the multi-flow object; and a correlation logic configured to conduct the first analysis of the multi-flow object and produce results of the first analysis of the multi-flow object.

24. The electronic device of claim 19, wherein the classification engine comprises:

a score determination logic that computes a score that represents whether the multi-flow object is an exploit, the score being based on the results from the dynamic analysis engine and the results of the second analysis of the multi-flow object by the network-traffic static analysis logic.

25. The electronic device of claim 24, wherein the classification engine further comprises prioritization logic that is configured to apply weighting to the results from the dynamic analysis engine and the results from the network-traffic static analysis logic.

26. The electronic device of claim 24, wherein the prioritization logic applies a first weighting to the results from the network-traffic static analysis logic and a second weighting to the results from the dynamic analysis engine, the first weighting being different than the second weighting.

27. The electronic device of claim 16, wherein the triggering event is a determination by the classification engine that the results from the dynamic analysis engine fail to identify the multi-flow object has characteristics associated with the malicious attack.

28. The electronic device of claim 27, wherein the classification engine fails to identify the multi-flow object has characteristics associated with the malicious attack due to one or more factors including (1) a software detect that comprises (i) the at least one virtual machine using an application that failed to trigger one or more anomalous behaviors during the virtual processing of the multi-flow object, or (ii) the at least one virtual machine crashing, or (2) incomplete content analyzed including a failure by the at least one virtual machine to virtually process certain information within the multi-flow object due to time constraints in the virtual processing of the information within the multi-flow object.

29. The electronic device of claim 16, wherein the multi-flow object includes at least a first data flow of the plurality of related data flows and a second data flow of the plurality of related data flows that is responsive to the first data flow, the first data flow including information associated with a HTTP GET request message and the second data flow including information associated with a HTTP GET response message responsive to the HTTP GET request message.

* * * * *